(12) United States Patent
Zhu (10) Patent No.: US 8,059,622 B2
(45) Date of Patent: Nov. 15, 2011

(54) MULTI-RADIO PLATFORM AND METHOD FOR COORDINATING ACTIVITIES BETWEEN A BROADBAND WIRELESS ACCESS NETWORK TRANSCEIVER AND CO-LOCATED TRANSCEIVER

(75) Inventor: Jing Zhu, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 12/330,701

(22) Filed: Dec. 9, 2008

(65) Prior Publication Data

US 2010/0056136 A1  Mar. 4, 2010

Related U.S. Application Data

(60) Provisional application No. 61/094,357, filed on Sep. 4, 2008.

(51) Int. Cl.
H04B 1/38  (2006.01)
H04B 7/00  (2006.01)
H04J 1/00  (2006.01)
H04Q 7/24  (2006.01)

(52) U.S. Cl. ........ 370/338; 370/281; 370/329; 370/345; 455/41.2; 455/426.1; 455/509

(58) Field of Classification Search .................. 370/254, 370/281, 315, 329, 336, 338, 345, 395.4; 455/41.2, 62, 426.1, 550.1, 553.1, 509, 73
See application file for complete search history.

(56) References Cited

U.S. PATENT DOCUMENTS

| | | | |
|---|---|---|---|
| 7,002,943 B2 | 2/2006 | Bhagwat et al. | |
| 7,545,787 B2 | 6/2009 | Bitran et al. | |
| 7,688,784 B2 | 3/2010 | Bitran et al. | |
| 7,733,835 B2 | 6/2010 | Sammour et al. | |
| 2007/0274272 A1 | 11/2007 | Joshi et al. | |
| 2008/0240048 A1 | 10/2008 | Okker et al. | |
| 2008/0240059 A1 | 10/2008 | Kang | |
| 2009/0003303 A1 | 1/2009 | Zhu et al. | |
| 2009/0109907 A1 | 4/2009 | Tsai et al. | |
| 2009/0185521 A1* | 7/2009 | Li et al. | 370/315 |
| 2009/0245133 A1 | 10/2009 | Gupta et al. | |
| 2009/0252075 A1* | 10/2009 | Ji et al. | 370/312 |
| 2009/0252128 A1* | 10/2009 | Yang et al. | 370/338 |

(Continued)

OTHER PUBLICATIONS

"Multi-Transceiver Mobile Communication Device and Methods for Negative Scheduling", U.S. Appl. No. 12/115,722, filed May 6, 2008.
"U.S. Appl. No. 12/115,722, Non Final Office Action mailed Mar. 7, 2011", 9 pgs.
"U.S. Appl. No. 12/115,722, Notice of Allowance mailed Aug. 22, 2011", 12 pgs.

(Continued)

Primary Examiner — Afsar M. Qureshi
(74) Attorney, Agent, or Firm — Schwegman, Lundberg & Woessner, P.A.; Gregory J. Gorrie (57) ABSTRACT

Embodiments of a multi-radio platform (MRP) and method for coordinating activities between a broadband wireless access network (BWAN) transceiver and a co-located transceiver are generally described herein. In some embodiments, the BWAN transceiver includes a MRP coexistence controller that generates a co-located coexistence (CLC) request message in response to a request from the co-located transceiver for transmission to a BWAN base station to reserve time for communications by the co-located transceiver. The CLC request message may include parameters for a requested CLC class. When a CLC class is accepted by the base station, the BWAN base station may refrain from scheduling communications with the BWAN transceiver during the reserved time to allow interference-free communications between the co-located transceiver a local wireless device.

27 Claims, 4 Drawing Sheets

U.S. PATENT DOCUMENTS

| | | | |
|---|---|---|---|
| 2009/0252134 A1* | 10/2009 | Schlicht et al. | 370/338 |
| 2009/0257392 A1 | 10/2009 | Hosein | |
| 2009/0279511 A1 | 11/2009 | Zhu | |
| 2010/0061326 A1* | 3/2010 | Lee et al. | 370/329 |
| 2010/0173586 A1* | 7/2010 | McHenry et al. | 455/62 |
| 2010/0202416 A1 | 8/2010 | Wihelmsson et al. | |

OTHER PUBLICATIONS

"U.S. Appl. No. 12/115,722, Response filed Jun. 3, 2011 to Non Final Office Action mailed Mar. 7, 2011", 12 pgs.

"Multi-Transceiver Mobile Communication Device and Methods for Negative Scheduling", U.S. Appl. No. 12/115,722, filed May 6, 2008.

* cited by examiner

CLC CLASS TIMING PARAMETERS

MULTI-RADIO PLATFORM AND METHOD FOR COORDINATING ACTIVITIES BETWEEN A BROADBAND WIRELESS ACCESS NETWORK TRANSCEIVER AND CO-LOCATED TRANSCEIVER

This application claims the benefit of priority under 35 U.S.C. 119(e) to U.S. Patent Application Ser. No. 61/094,357, filed on Sep. 4, 2008, which is incorporated herein by reference in its entirety.

TECHNICAL FIELD

Some embodiments pertain to wireless communications. Some embodiments pertain to mobile communication devices that include more than one transceiver for communicating in accordance with different wireless communication techniques. Some embodiments pertain to multi-transceiver mobile communication devices that include co-located transceivers, such as a broadband wireless access network (BWAN) transceiver (e.g., a Worldwide Interoperability for Microwave Access (WiMax) transceiver or a 3GPP Long Term Evolution (LTE) transceiver) and a local transceiver (e.g., a Wireless Local Area Network (WLAN) transceiver or a Bluetooth (BT) transceiver).

BACKGROUND

Many wireless communication devices today include more than one radio transceiver for communicating with wireless access networks as well as for communicating with local wireless devices. One issue with these multi-transceiver devices is that the communications of one transceiver may interfere with the communications of another transceiver.

Thus, there are general needs for multi-radio platforms and methods that help reduce and/or eliminate conflicts between the co-located transceivers of a multi-transceiver mobile communication device.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
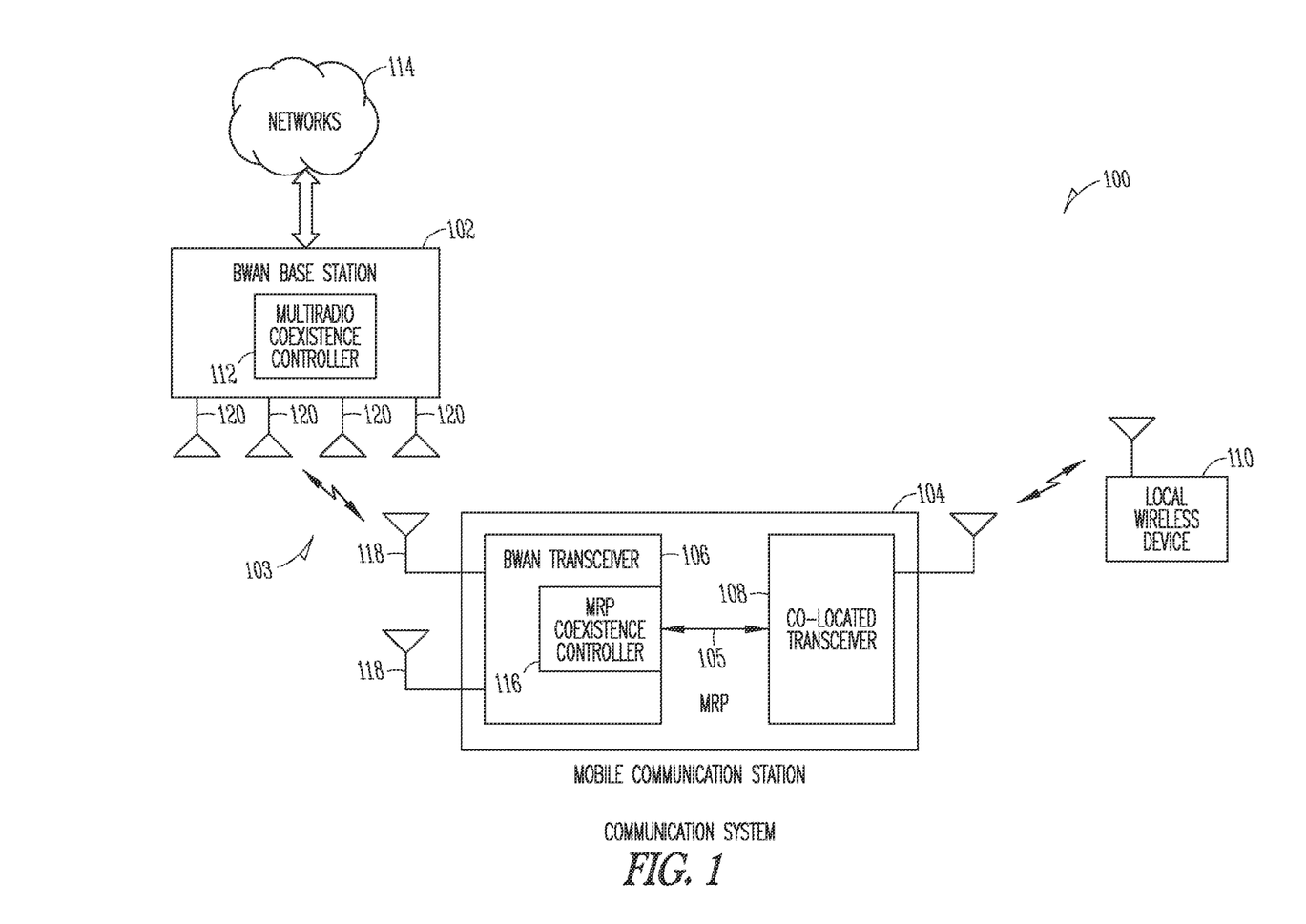
FIG. 1 is a functional block diagram of communication system in accordance with some embodiments.

FIG. 1 is a functional block diagram of communication system in accordance with some embodiments. Communication system 100 includes broadband wireless access network (BWAN) base station 102, mobile communication station 104 and local wireless device 110. Mobile communication station 104 may be a multi-radio platform (MRP) and may include BWAN transceiver 106 and co-located transceiver 108. BWAN transceiver 106 may be configured to communicate with BWAN base station 102 using BWAN frames 103. Co-located transceiver 108 may be configured to communicate with one or more local devices, such as local wireless device 110. Co-located transceiver 108 may include one or more local transceivers described in more detail below. Co-located transceiver 108 may, among other things, discover local wireless device 110, establish a connection with local wireless device 110, and communicate with local wireless device 110, as described in more detail below. BWAN base station 102 may be coupled with one or more networks 114, which may include an access service network, the Internet and a telephone network to provide communications between networks 114 and mobile communication device 104.

In accordance with embodiments, mobile communication device 104 includes MRP coexistence controller 116 to interface with BWAN transceiver 106 and co-located transceiver 108 over internal radio interface 105. BWAN base station 102 may include multi-radio coexistence controller 112 for coordinating coexistence activities with MRP coexistence controller 116. In accordance with some embodiments, MRP coexistence controller 116 may be configured to allow BWAN transceiver 106, BWAN base station 102 and co-located transceiver 108 to cooperate in a time-division multiplexed (TDM) fashion by collaboratively coordinating activities of these multiple transceivers to avoid mutual interference. These embodiments are described in more detail below. In some embodiments, MRP coexistence controller 116 may be part of BWAN transceiver 106, although the scope of the embodiments is not limited in this respect.

In accordance with some embodiments, MRP coexistence controller 116 is configured to generate a co-located coexistence (CLC) request message in response to a request from co-located transceiver 108. The CLC request message may be transmitted to multi-radio coexistence controller 112 of BWAN base station 102 to reserve time for communications by co-located transceiver 108. In these embodiments, the CLC request message may include parameters for a requested CLC class. During the reserved time, BWAN base station 102 may be configured to refrain from scheduling communications with BWAN transceiver 106.

In some embodiments, the CLC request message transmitted to BWAN base station 102 may be a request to reserve time within BWAN frames 103 to allow interference-free communications by co-located transceiver 108 and local wireless device 110. In some embodiments, BWAN base station 102 may be configured to refrain from scheduling communications within an active interval which occurs during portions of BWAN uplink or downlink subframes of BWAN frames 103.

In some embodiments, the CLC request messages sent by mobile communication device 104 and the CLC response messages sent by BWAN base station 102 may comprise mobile (MOB) management messages or management frames in accordance with the communication standards applicable to the BWAN.

In some embodiments, mobile communication device 104 may operate as a wireless mobile communication device in a BWAN. In these embodiments, CLC class operations provide for periodic time intervals granted by BWAN base station 102 in which asynchronous downlink or/and uplink allocations of unicast transmissions in a connected state may be prohibited to protect operations of co-located transceiver 108. CLC class operations may avoid impacting broadcast and multicast traffic as well as synchronous (i.e., periodic) unicast traffic for mobile communication station 104.

Mobile communication station may be almost any wireless communication device including a desktop, laptop or portable computer with wireless communication capability, a web tablet, a wireless or cellular telephone, an access point or other device that may receive and/or transmit information wirelessly. Although the various entities of mobile communication device 104 and BWAN base station 102 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. In some embodiments, the functional elements of mobile communication device 104 and BWAN base station 102 illustrated in FIG. 1 may refer to one or more processes operating on one or more processing elements.

The term "BWAN" may refer to devices and networks that communicate using any broadband wireless access communication technique, such as orthogonal frequency division multiple access (OFDMA), that may potentially interfere with the spectrum utilized by co-located transceiver 108, including interference due to out-of-band (OOB) emissions. In some embodiments, BWAN transceiver 106 may be a Worldwide Interoperability for Microwave Access (WiMAX) transceiver and BWAN base station 102 may be a WiMAX base station configured to communicate in accordance with at least some Electrical and Electronics Engineers (IEEE) 802.16 communication standards for wireless metropolitan area networks (WMANs) including variations and evolutions thereof, although the scope of the embodiments is not limited in this respect. For more information with respect to the IEEE 802.16 standards, please refer to "IEEE Standards for Information Technology—Telecommunications and Information Exchange between Systems" Metropolitan Area Networks—Specific Requirements—Part 16: "Air Interface for Fixed Broadband Wireless Access Systems," May 2005 and related amendments and versions thereof.

In some other embodiments, BWAN transceiver 106 and BWAN base station 102 may communicate in accordance with at the 3rd Generation Partnership Project (3GPP) Universal Terrestrial Radio Access Network (UTRAN) Long Term Evolution (LTE) communication standards, release 8, March 2008, including variations and evolutions thereof, although the scope of the embodiments is not limited in this respect.

Co-located transceiver 108 may include one or more transceivers including one or more of a Bluetooth, a wireless local area network (WLAN) and a Wireless Fidelity (WiFi) transceiver. The WLAN and WiFi transceivers may communicate in accordance with the IEEE 802.11(a), 802.11(b), 802.11(g), 802.11(h) and/or 802.11(n) standards and/or proposed specifications. For more information with respect to the IEEE 802.11 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999" and related amendments/versions.

Bluetooth, as used herein, may refer to a synchronous short-range digital communication protocol including a short-haul wireless protocol frequency-hopping spread-spectrum (FHSS) communication technique operating in the 2.4 GHz spectrum. The use of the terms WiFi, WLAN, Bluetooth, WiMAX and LTE are not intended to restrict the embodiments to any of the requirements of the standards and specifications relevant to WiFi, Bluetooth, and WiMax.

In some multiple-input, multiple-output (MIMO) embodiments, BWAN transceiver 106 may use two or more antennas 118 for communications and BWAN base station 102 may use two or more antennas 120 for communications. In these embodiments, antennas 118 may be effectively separated from each other and antennas 120 may be effectively separated from each other to take advantage of spatial diversity and the different channel characteristics that may result between each of antennas 118 and each of antennas 120. Antennas 118 and 120 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some embodiments, antennas 118 and antennas 120 may be separated by up to ⅒ of a wavelength or more.

Some embodiments are directed to a BWAN. These embodiments may include a plurality of mobile communication stations, such as mobile communication station 104, and a BWAN base station, such as BWAN base station 102. At least one of the mobile communication stations includes a MRP including a BWAN transceiver and a co-located transceiver. In these embodiments, the BWAN transceiver includes a MRP coexistence controller. The BWAN base station may be configured to respond to a CLC request message from the BWAN transceiver to reserve time for interference-free communications by the co-located transceiver. In these embodiments, the CLC request message may include parameters for a requested CLC class. When the requested CLC class is accepted, the BWAN base station may refrain from scheduling communications with the BWAN transceiver during an active interval based at least in part based on the parameters of the CLC request message to allow interference-free communications between the co-located transceiver and a local wireless device.

In some WiMAX embodiments, BWAN base station 102 communicates with mobile communication station 104 within OFDMA downlink and uplink subframes 103, and the active interval occur during a plurality of the downlink and uplink subframes. In these embodiments, the downlink and uplink subframes and time-division multiplexed comprise a same set of a plurality of frequency subcarriers.

In some LTE embodiments, BWAN base station 102 transmits to mobile communication station 104 using OFDMA downlinks and mobile station 104 transmits to BWAN base station 102 using a single-carrier multiple access uplink. The downlinks and the single-carrier multiple access uplink comprise non-interfering frequency subcarriers.

Figure 2:
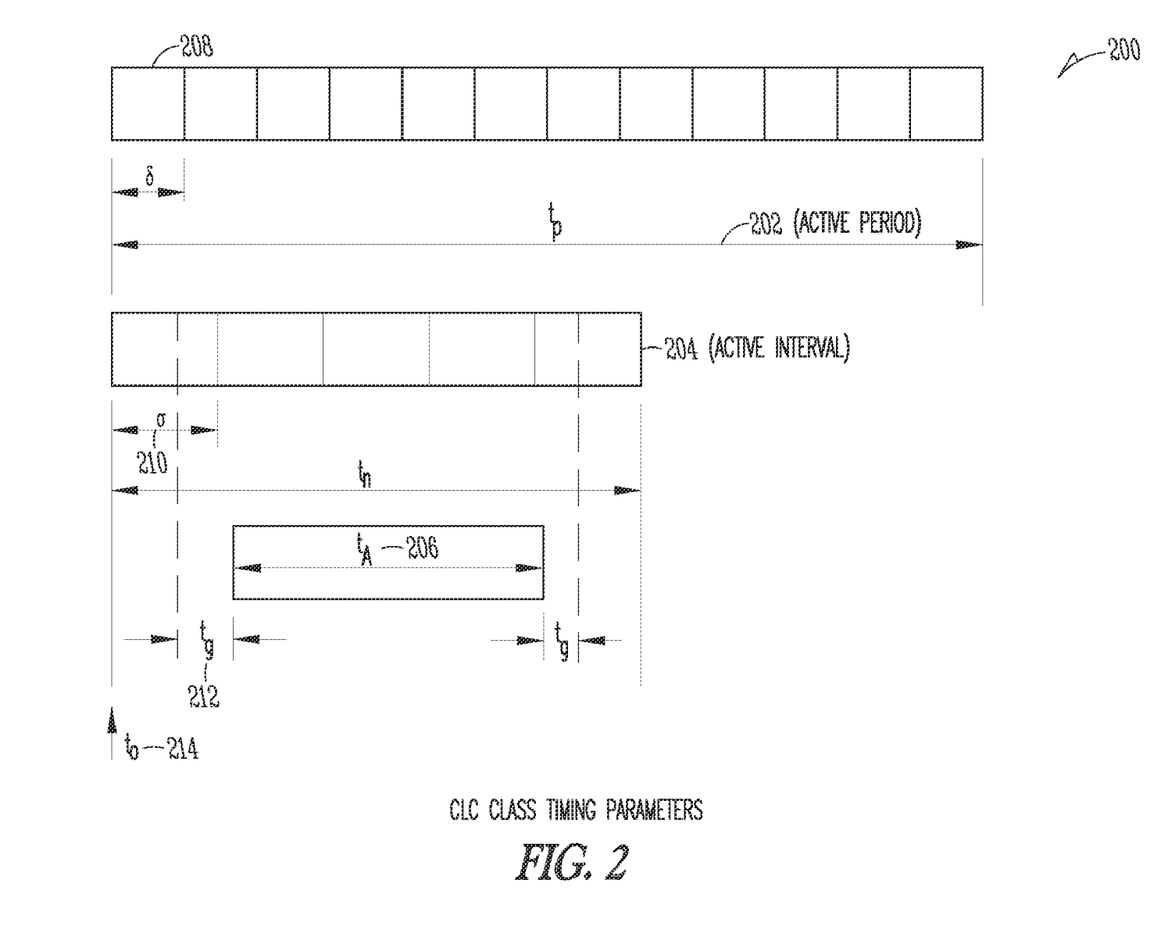
FIG. 2 illustrates timing parameters of co-located coexistence (CLC) operations in accordance with some embodiments.

FIG. 2 illustrates timing parameters of co-located coexistence (CLC) operations in accordance with some embodiments. CLC class timing parameters 200 include active interval $t_a$ 204, active period $t_p$ 202 and active ratio r ($r=t_a/t_p$). Actual active interval $t_A$ 206 for co-located transceiver 108 (FIG. 1) may be within active interval 204. Actual active interval 206 may include additional guard time $t_g$ 212 to accommodate clock drift between two transceivers. For example, with ±50 ppm clock drift, a 50 μs guard time may be provided to ensure that the actual activity of co-located transceiver 108 (FIG. 1) occurs within active interval 204 (e.g., for at least one second). Considering the discrete granularity of active interval 204, active interval 204 may be described by Equation (1) below. An additional "1" is added to help ensure that activity of co-located transceiver 108 (FIG. 1) aligns with active interval 204.

$$t_a = \left( \left\lceil \frac{t_A + 2t_g}{\sigma} \right\rceil + 1 \right) \sigma \qquad (1)$$

In Equation (1), σ (illustrated by reference number 210) refers to a time unit for active interval 204 and may comprise a multiple number of BWAN symbols or a predetermined time period (e.g., a predetermined number of microseconds). In FIG. 2, δ (illustrated by reference number 208) is a unit of active period 202 and may be specified as a number of time periods (e.g., microseconds) or as a number of BWAN frames, which may begin at time $t_o$ 214. If co-located transceiver 108 (FIG. 1) can be synchronized with BWAN transceiver 106 (FIG. 1), the guard interval or "1" is optional and active interval 204 may be reduced to $$t_a = \left( \left\lceil \frac{t_A}{\sigma} \right\rceil \right) \sigma. \qquad (2)$$

In accordance with some embodiments, as part of a registration process for network entry, MRP coexistence controller 116 (FIG. 1) may be configured to cause BWAN transceiver 106 (FIG. 1) to request whether BWAN base station 102 (FIG. 1) supports CLC class operation by setting one or more CLC class support bits in a registration request message at network entry. A registration response message received from BWAN base station 102 (FIG. 1) may include an indication that base station 102 (FIG. 1) supports CLC class operation. The indication may include one or more parameter limits of supported CLC classes. The parameter limits may include at least a maximum active interval $t_a$ and a maximum active ratio r.

Figure 3:
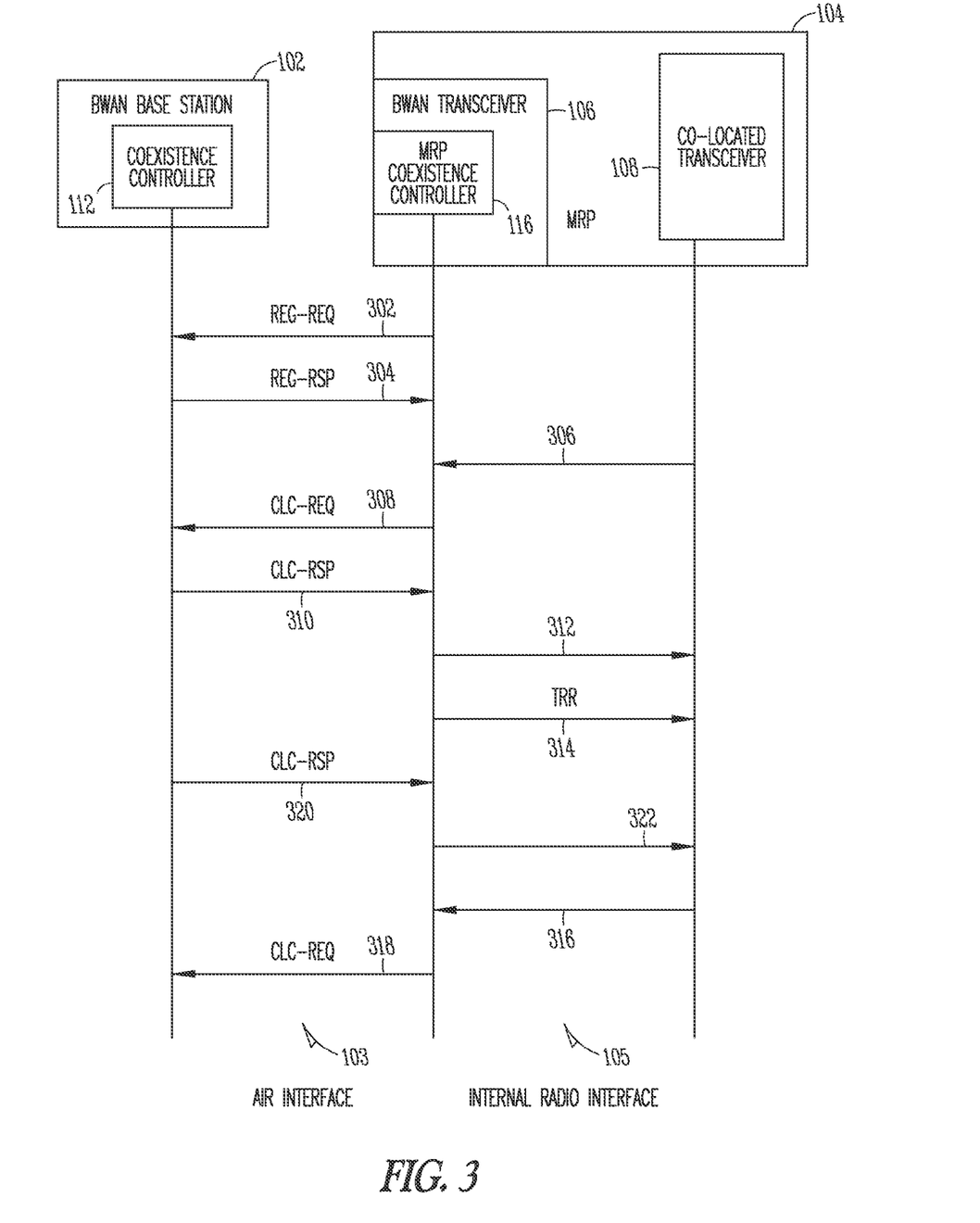
FIG. 3 illustrates messages communicated between various functional elements in accordance with some embodiments.

FIG. 3 illustrates messages communicated between various functional elements in accordance with some embodiments. At network entry, BWAN transceiver 106 transmits registration request (REG-REQ) message 302 to BWAN base station 102, and BWAN base station 102 may respond with registration response (REG-RSP) message 304 to register BWAN transceiver 106. Messages 302 and 304 may be transmitted within BWAN frames 103 over the air interface. In accordance with some embodiments, MRP coexistence controller 116 is configured to cause BWAN transceiver 106 to request whether BWAN base station 102 supports CLC class operation by setting one or more CLC class support bits in registration request message 302 at network entry. Registration response message 304 received from BWAN base station 102 may indicate whether or not BWAN base station 102 supports CLC class operation. Coexistence controller 112 of BWAN base station 102 may provide this indication. The indication may include one or more parameter limits of the supported CLC classes. The parameter limits may include a maximum active interval and a maximum active ratio as discussed above. In some embodiments, registration response message 304 may include bits in a type-length value (TLV) format indicating that BWAN base station 102 supports CLC class operation and indicating the one or more parameter limits of supported CLC classes.

In some embodiments, as part of the registration process, BWAN transceiver 106 may also receive, within the registration response message 304, an indication of BWAN parameters affected during CLC class operations. In these embodiments, registration response message 304 may further include bits in a TLV format indicating the BWAN parameters affected during CLC class operations. The BWAN parameters indicated to be affected during CLC class operations include, for example, one or more of a maximum latency and a maximum data rate for BWAN communications between BWAN transceiver 106 and BWAN base station 102. In some embodiments, the BWAN parameters indicated within the registration response message 304 may include any BWAN parameters that affect BWAN performance including quality-of-service (QoS) related parameters of QoS parameter sets. In these embodiments, when a QoS parameter set of a current BWAN service flow is a subset of a QoS parameter set indicated within registration response message 304, and when the parameters of the requested CLC class are within the CLC limits, BWAN base station 102 may accept the request. For example, when a smaller QoS parameter value indicates less resources (e.g., Maximum Traffic Rate) a QoS parameter set A is a subset of a QoS parameter set B if the QoS parameter in QoS parameter set A is less than or equal to the same parameter in QoS parameter set B. When a larger QoS parameter value indicates less resources (e.g., Tolerated Grant Jitter), QoS parameter set A is a subset of QoS parameter set B if the parameter in QoS parameter set A is greater than or equal to the same parameter in QoS parameter set B. When the QoS parameter is not quantitative, QoS parameter set A is a subset of QoS parameter set B when the parameter in QoS parameter set A is equal to the same parameter in QoS parameter set B.

When co-located transceiver 108 needs to or is planning to communicate with local wireless device 110 (FIG. 1), request 306 may be sent from co-located transceiver 108 to activate one of a plurality of CLC classes. In response to request 306, MRP coexistence controller 116 may generate and send CLC request message 308 to BWAN base station 102. CLC response 310 may be received from BWAN base station 102 indicating whether the requested one or more CLC classes has been accepted. In some embodiments, CLC request message 308 may be sent to BWAN base station 102 using a connection identifier (CID) that was established during registration and network entry.

In some embodiments, the CLC classes may include one or more static CLC classes in which a time pattern for scheduling active interval 204 is not configurable by BWAN base station 102. The CLC classes may also include a dynamic CLC class in which the time pattern for scheduling active interval 204 is configurable by BWAN base station 102. In these embodiments, the static CLC classes may include a Type I CLC class in which the communication period of co-located transceiver 108 can be configured to fit within an integer number of BWAN frames. The static CLC classes may also comprise a Type II CLC class in which the communication period of co-located transceiver 108 is not configurable to fit within an integer number of BWAN frames. The dynamic CLC class may include a Type III CLC class in which the time pattern is configurable by BWAN base station 102. For each accepted Type III CLC class, BWAN base station 102 may also specify CLC active intervals. In some embodiments, BWAN base station 102 will accept a CLC class request if the request meets certain CLC class limits. The CLC class limits for different CLC class types may, for example, be defined in an air-interface standard (e.g., IEEE 802.16 or 3GPP LTE) or as announced by BWAN base station 102 in registration response message 304 (discussed above), although the scope of the embodiments is not limited in this respect.

Some examples of CLC class types selectable by mobile communication device 104 are illustrated in the table below:

|  |  | Time period equal to an integer number of BWAN frames. | |
| --- | --- | --- | --- |
|  |  | Yes | No |
| Time pattern reconfigurable by the base station | No (static) | Type I | Type II |
|  | Yes (dynamic) | Type III | N/A |

In some embodiments, when mobile communication device 104 requests a CLC class that exceeds the parameter limits provided in registration response message 304, BWAN base station 102 may choose to either reject or accept the request depends on current conditions. If CLC request message 308 is rejected, BWAN base station 102 may indicate the parameter limits of the rejected CLC classes in CLC response 310 if they have not been provided to mobile communication device 104. If a CLC class is accepted, BWAN base station 102 may be configured to refrain from allocating asynchronous unicast traffic to mobile communication device 104 in CLC active intervals 204. BWAN base station 102 may still allocate data or ACK's for retransmissions with synchronous HARQ in CLC active intervals. In some embodiments, when a synchronous scheduling support bit (e.g., bit #7 discussed below) of Enhanced CLC Support bits from BWAN base station 102 is set, BWAN base station 102 may be configured to refrain from allocating any new data for mobile communication device 104 in other subframes within the same frame to provide no allocations for mobile communication device 104. In this way, co-located transceiver 108 may reschedule its transmissions within other potential BWAN subframes when the reserved subframes are used for BWAN retransmissions.

In some embodiments, one of the static CLC classes (e.g., Type I) may be requested for synchronous short-range digital communications, such as Bluetooth communications. The communication period of Bluetooth may be configured to fit within an integer number of BWAN frames. For example, four Bluetooth communication periods may fit within several (e.g., three) WiMAX frames. In these embodiments, co-located transceiver 108 and local wireless device 110 communicate in accordance with Bluetooth communication techniques.

In some embodiments, one of the static CLC classes (e.g., Type II) may be requested for WiFi beacon interval broadcasts. WiFi beacon interval broadcasts have a period of 102.4 ms, while WiMAX frames have a period of 105 ms.

In some embodiments, the dynamic CLC class (e.g., Type III) may be requested for WLAN data communications which are not necessarily an integer number of BWAN frames. The WLAN data communications may be transmissions and receptions by co-located transceiver 108 in accordance with one of the IEEE 802.11 standards. Alternately, one of the static CLC classes may be requested for WLAN data communications.

Based on the CLC class accepted by BWAN base station 102, MRP coexistence controller 116 may indicate the accepted CLC class to co-located transceiver 108 in message 312. The indication may include parameters of the accepted CLC class including a transmission or reception time and the active interval length. MRP coexistence controller 116 may provide temporal RF release (TRR) message 314 to instruct co-located transceiver 108 when to conduct transmissions and receptions. In some embodiments, temporal RF release message 314 may be provided at a beginning of each active interval 204. Accordingly, co-located transceiver 108 may conduct interference-free communications in response to TRR message 314.

When co-located transceiver 108 completes an associated activity (e.g., completes a data transmission or reception), request 316 may be sent from co-located transceiver 108 to terminate one or more active CLC classes. MRP coexistence controller 116 may send CLC request message 318 to BWAN base station 102 to terminate the one or more active CLC classes. In these embodiments, MRP coexistence controller 116 does not need to receive a response from BWAN base station 102 to confirm termination of the one or more CLC classes, although the scope of the embodiments is not limited in this respect.

If BWAN base station 102 is to change a time pattern and reconfigure an accepted CLC class, CLC response message 320 may be sent from BWAN base station 102. In these embodiments, the reconfigured CLC class may be configured to at least meet the request accepted in a previous response, such as CLC response 310. In response to receipt of CLC response message 320, MRP coexistence controller 116 may notify co-located transceiver 108 of changed time pattern and/or reconfigured CLC class in indication message 322.

As mentioned above, enhanced CLC support bits may be included as a TLV in registration request message 302 and registration response message 304. In these embodiments, the TLV may indicate if CLC class operations are supported. In these embodiments, mobile stations, such as mobile communication device 104, and base stations, such as BWAN base station 102, that support CLC class operations may identify themselves by including this TLV. For each bit, a value of 0 may be used to indicate that CLC class operations are not supported while a value of 1 may be used to indicate that CLC class operations are supported. An example of an enhanced CLC support TLV is described in the table below.

Enhanced CLC Support TLV

| Type | Length | Value | Scope |
| --- | --- | --- | --- |
| 24 | 1 | Bit #0: PSC-based CLC mode 1<br>Bit #1: PSC-based CLC mode 2<br>Bit #2: Sleep mode follows the MAP relevance for PSC-based CLC<br>Bit #3: Uplink band AMC for PSC-based CLC<br>Bit #4: Type I enhanced CLC support<br>Bit #5: Type II enhanced CLC support<br>Bit #6: Type III enhanced CLC support<br>Bit #7: Synchronous Scheduling Support | REG-REQ & REG-RSP |

In these embodiments, bits #4, #5, #6, or #7 of the enhanced CLC support TLV are not set to 1 if bit #0 or bit #1 is set to 1. Bit #7 of the enhanced CLC support TLV is not set to 1 if bits #4, #5, and #6 are all set to 0.

In some embodiments, an enhanced CLC limits TLV may be included in registration response message 304 and registration CLC response 310. In these embodiments, the enhanced CLC limits TLV may indicate the range of the parameters for CLC Type I, II, and III classes. BWAN base station 102 may include the enhanced CLC limits TLV to notify mobile communication device 104 how enhanced CLC support is to operate. In these embodiments, the enhanced CLC limits TLV may define an envelope that limits the values of the parameters of Type I, II, and III CLC classes. The table below illustrates an example of an enhanced CLC limits TLV.

Enhanced CLC limits TLV

| Type | Length | Value | Scope |
|------|--------|-------|-------|
| XX | 4 | Byte 1:<br>Bit #0 = 1: the limits are provided for Type I enhanced CLC classes<br>Bit #1 = 1: the limits are provided for Type II enhanced CLC classes<br>Bit #2 = 1: the limits are provided for Type III enhanced CLC classes<br>Bit #3 = 1: the limits are provided for the CLC classes that impact RX<br>Bit #4 = 1: the limits are provided for the CLC classes that impact TX<br>Bit #5 = 1: the limits are provided for the CLC classes that impact both TX and RX<br>Bit #6-7: the maximum number of active classes is $2^p$, e.g. 1, 2, 4, 8<br>Byte 2:<br>Bit #0-4: the maximum CLC active ratio<br>0: no limits<br>p: the maximum CLC active ratio is p/32<br>Bit #5-7: the minimum latency<br>7: no limits<br>p: the minimum latency is $2^p$ frames, e.g. 1, 2, 4, 8, 16, 32, 64 (=320ms)<br>Byte 3: the maximum active interval<br>0: no limits<br>p: 1~255 (=1.275s) frames<br>Byte 4: the maximum forecast interval (set if Byte 1: Bit #2 = 1)<br>0: no limits<br>x: 1-255 (=1.275s) frames | REG-RSP<br>MOB_CLC-RSP |

In some embodiments, mobile communication device 104 supporting enhanced CLC operations may use a mobile CLC request (MOB_CLC-REQ) message to request activation of or make changes to certain CLC Type I, II, and III classes. The mobile CLC request message may correspond to CLC request message 308 or CLC request message 318. The mobile CLC request message may be sent from mobile communication device 104 to BWAN base station 102 on the CID. The table below illustrates an example format for a mobile CLC request message.

Mobile CLC Request Message

| Syntax | Size (bit) | Notes |
|--------|------------|-------|
| MOB_CLC-REQ_Message_format | | |
| Management Message Type = X | 8 | |
| CLC Class Active Indication Map | 8 | |
| Number of Classes | 8 | number of new or/and updated CLC classes |
| If (Number of Classes > 0) { | | |
| for (i=0; i < Number of Classes; i++) { | | |
| CLC_Class_ID | 3 | |
| CLC_Class_Type | 2 | |
| CLC_Class_Impact | 2 | |
| Start Frame Number | 8 | |
| Reserved | 1 | |
| If (CLC_Class_Type=1) { | | |
| Unit | 3 | |
| Length | 5 | |
| bitmap | variable | |
| padding | variable | If needed, for alignment to byte boundary |
| If (CLC_Class_Type=2) { | | |
| Active Interval | 7 | |
| Active Period | 22 | |

-continued

| Syntax | Size (bit) | Notes |
|--------|------------|-------|
| Start Time Offset | 3 | |
| If (CLC_Class_Type=3) { | | |
| Minimum Active Ratio | 5 | |
| Minimum Active Interval | 3 | |
| Maximum Latency | 6 | |
| Minimum Forecast Interval | 8 | |
| Reserved | 2 | |

Example parameters of the mobile CLC request message may be defined as follows:

CLC Class Active Indication Map
  Each bit corresponds to the status of a CLC class. A maximum of 8 different CLC classes may be indicated.
  1=active (or to be activated or updated)
  0=inactive (or to be deactivated)
CLC_Class_ID
  Assigned CLC class identifier. The ID may be unique within the group of CLC classes associated with the MS. This ID may be used in further MOB_CLC-REQ/RSP messages for activation and/or deactivation of CLC class.
CLC_Class_Type
  0b01=enhanced CLC class type I
  0b10=enhanced CLC class type II
  0b11=enhanced CLC class type III
CLC_Class_Impact
  0b01=the CLC class impacts Rx
  0b10=the CLC class impacts Tx
  0b11=the CLC class impacts both Rx and Tx
Start Frame Number
  Start frame number for the first CLC active period
  For Type III, it indicates the latest frame of the first CLC active period Unit (for Type I)
The time interval that a bit in the bitmap represents. It may be calculated as $2^p$ subframes, e.g., 1, 2, 4, 8, 16, 32, 64, 128 (=80 ms)
Length (for Type I)
The number of bits of the bitmap
0: 32; p: 1~31
Bitmap (for Type I)
Each bit in the bitmap may indicate whether the CLC class is active in the corresponding interval. The duration of the bitmap may be determined by the number of bits and may be equal to the integer number of BWAN frames 103 (FIG. 1). The bitmap may support a CLC class with the active period up to 4~512 frames depending on the value of unit.
0=inactive; 1=active
Active Interval (for Type II)
The number of type-1 subframes (e.g., 6 symbols) of the Type II CLC active interval.
0: 128 (max=80 ms); p: 1~127
Active Period (for Type II)
The number of microseconds of the Type II CLC active period.
Start Time Offset (for Type II)
The number of subframes between the first active interval and the first active period.
0~7
Minimum Active Ratio (for Type III)
The minimum ratio of the total active time (in subframe) to the duration of the active period (in subframe).
0: not specified; p: the minimum active ratio=p/32
Minimum Active Interval (for Type III)
The minimum number of subframes ($2^p$) of each active interval, e.g., 1, 2, 4, 8, 16, 32, 64, 128 (=80 ms).
Maximum Latency (for Type III)
The maximum number of frames between two successive active intervals
0: not specified; p: 1~63 (315 ms).
Minimum Forecast Interval (for Type III)
The minimum number of frames between the time MOB_CLC-RSP is sent out by BS and the time the first CLC active period starts.
0: not specified; p: 1~255 (1.275 seconds)

In some embodiments, a mobile CLC response (MOB_CLC-RSP) message, such as such as CLC response 310, may be sent from BWAN base station 102 to mobile communication device 104 on the mobile station's basic CID in response to a mobile CLC request message. BWAN base station 102 may also send an unsolicited mobile CLC response message, such as mobile CLC response message 320, to reconfigure Type III CLC classes by using the same CLC class identifier. The table below illustrates an example format of these mobile CLC response messages.

Mobile CLC Response Message Format

| Syntax | Size (bit) | Notes |
|---|---|---|
| MOB_CLC-RSP_Message_format( ) { | | |
| Management Message Type = Y | 8 | |
| CLC Class Active Indication Map | 8 | |
| Number of Classes | 8 | number of new or/and updated Type III CLC classes |
| If (Number of Classes > 0) { | | |
| for (i=0; i < Number of Classes; i++) { | | |
| CLC_Class_ID | 3 | |
| Start Frame Number | 8 | start frame number of the first active period |
| Format | 1 | |
| Reserved | 4 | |
| If (Format = 0) { | | suitable for the CLC class with multiple active intervals per period |
| Unit | 3 | |
| Length | 5 | |
| Bitmap | variable | |
| padding | variable | If needed, for alignment to byte boundary |
| If (Format = 1) { | | suitable for the CLC class with single active interval per period |
| Active Interval | 12 | |
| Active Period | 9 | |
| Start Time Offset | 3 | |
| TLV encoded items | variable | |

In some embodiments, the parameters of the mobile CLC response message may be configured as follows:
CLC Class Active Indication Map
Each bit corresponds to the status of a CLC class. There may be eight different CLC classes.
1=active (or to be activated or updated)
0=inactive (or to be deactivated)
CLC_Class_ID
Assigned CLC class identifier. The ID may be unique within the group of CLC classes associated with the MS. This ID may be used in further MOB_CLC-REQ/RSP messages for activation/deactivation of CLC class.
Start Frame Number
Start frame number for the first CLC active period
Unit (only for Format=0)
The time interval that a bit in the bitmap represents. It may be calculated as $2^p$ subframes, e.g., 1, 2, 4, 8, 16, 32, 64, 128 (=80 ms)
Length (only for Format=0)
The number of bits of the bitmap
0: 32; p: 1~31
Bitmap (only for Format=0)
Each bit in the bitmap indicates whether the CLC class is active in the corresponding interval. The duration of the bitmap may be determined by the number of bits, and may be equal to the integer number of frames. It can support a CLC class with the active period up to 4~512 (=2.56 s) frames depending on the value of Unit.
0=inactive; 1=active
Active Interval (only for Format=1)
The number of type-1 subframes (6 symbols) of the Type III CLC active interval (max=2.56 s)
Active Period (only for Format=1)
The number of frames of the Type III CLC active period (max=2.56 s)
Start Time Offset (only for Format=1)
The number of subframes between the first active interval and the first active period.

In some embodiments, mobile (MOB) CLC request messages may be used for requests 306 and 316, and mobile CLC response messages may be used for messages 312 and 322, although this is not a requirement. For improved real time coordination between BWAN transceiver 106 and co-located transceiver 108, TRR message 314 may be sent from BWAN transceiver 106 to co-located transceiver 108 to indicate how long co-located transceiver 108 is permitted to be active and to indicate the type of activity that is permitted. At the end of the duration, co-located transceiver 108 may be configured to automatically return to a default state (e.g., no transmissions or receptions). Message 314 may be implemented over internal radio interface 105 (FIG. 1), which may be configured as a General Purpose Input/Output (GPIO) or Universal Asynchronous Receiver/Transmitter (UART) connection. In these embodiments, a new TRR message may override a previous one. An example TRR message is illustrated in the table below.

Temporal RF Release (TRR) Message

|  | RF Release Duration | RF Release Status |
|---|---|---|
| Length | 22 bits | 2 bits |
| Description | the number of microseconds for the duration | Indicates what type of operation Radio X is allowed in the RF release duration.<br>00: both Tx and Rx<br>01: Tx<br>10: Rx |

Figure 4:
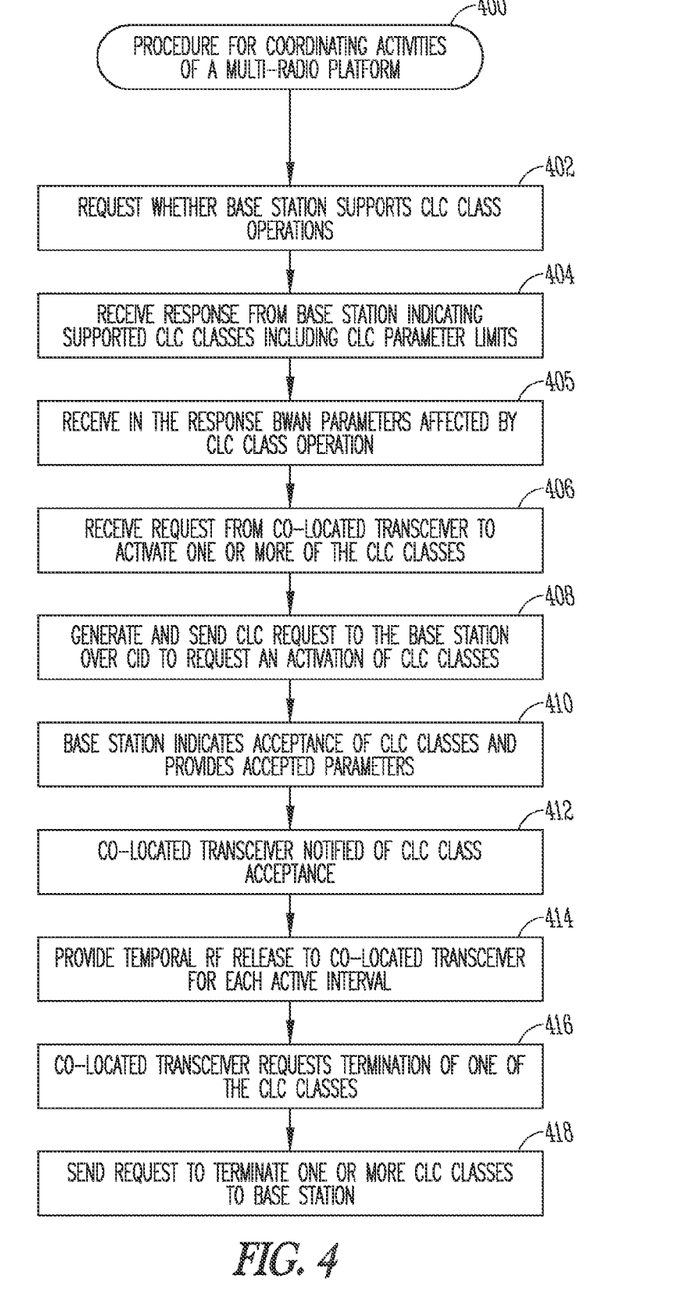
FIG. 4 is a flow chart of a procedure for coordinating activities of a multi-radio platform in accordance with some embodiments.

FIG. 4 is a flow chart of a procedure for coordinating activities of a multi-radio platform in accordance with some embodiments. Procedure 400 may be performed by a coexistence controller, such as MRP coexistence controller 116 (FIG. 1), although the scope of the embodiments is not limited in this respect.

In operation 402, MRP coexistence controller 116 may cause BWAN transceiver 106 to request whether BWAN base station 102 supports CLC class operation by setting one or more CLC class support bits in registration request message 302 at network entry.

In operation 404, MRP coexistence controller 116 may receive, within registration response message 304, an indication that BWAN base station 102 supports CLC class operation. The indication may include one or more parameter limits of supported CLC classes.

In operation 405, MRP coexistence controller 116 may receive, within registration response message 304, an indication of BWAN parameters affected during CLC class operation.

In operation 406, MRP coexistence controller 116 may receive request 306 from co-located transceiver 108 to activate one of the CLC classes.

In operation 408, MRP coexistence controller 116 may generate and cause BWAN transceiver 106 to send CLC request message 308 to BWAN base station 102 in response to request 306 received from co-located transceiver 108.

In operation 410, MRP coexistence controller 116 may receive a CLC response 310 from BWAN base station 102 indicating whether the requested CLC class has been accepted.

In operation 412, MRP coexistence controller 116 may indicate the accepted CLC class to co-located transceiver 108 with message 312. The indication may include parameters of the accepted CLC class, including a transmission or reception time and an active interval length.

In operation 414, MRP coexistence controller 116 may provide TRR message 314 to instruct co-located transceiver 108 when to conduct transmissions and receptions.

In operation 416, MRP coexistence controller 116 may receive request 316 from co-located transceiver 108 to terminate one or more active CLC classes after co-located transceiver 108 completes an associated activity.

In operation 418, MRP coexistence controller 116 may cause BWAN transceiver 106 to send CLC request message 318 to BWAN base station 102 to terminate the one or more active CLC classes.

At any time after acceptance of the one or more CLC classes by BWAN base station 102 in operation 410, CLC response message 320 may be received from BWAN base station 102 to change a time pattern and/or reconfigure an accepted CLC class. MRP coexistence controller 116 may notify co-located transceiver 108 of changed time pattern or reconfigured CLC class.

Although the individual operations of procedure 400 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or nonvolatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any tangible medium for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multi-radio platform (MRP) comprising a broadband wireless access network (BWAN) transceiver and a co-located transceiver, wherein the BWAN transceiver comprises a MRP coexistence controller configured to:
generate a co-located coexistence (CLC) request message in response to a request from a co-located transceiver, the CLC request message for transmission to a BWAN base station to reserve time for communications by the co-located transceiver, wherein the CLC request message includes parameters for a requested CLC class, and wherein during an active interval, the BWAN base station is configured to refrain from scheduling communications with the BWAN transceiver based at least in part on the parameters of the CLC request message to allow interference-free communications with a local wireless device.

2. The multi-radio platform of claim 1 wherein as part of a registration process for network entry, the MRP coexistence controller is configured to cause the BWAN transceiver to:

request whether the BWAN base station supports CLC class operation by setting one or more CLC class support bits in a registration request message at network entry; and receive within a registration response message from the BWAN base station an indication that the BWAN base station supports CLC class operation, the indication to include one or more parameter limits of supported CLC classes, the parameter limits including at least a maximum active interval and a maximum active ratio.

3. The multi-radio platform of claim 2 wherein as part of the registration process, the BWAN transceiver is further configured to receive within the registration response message an indication of BWAN parameters affected during CLC class operations.

4. The multi-radio platform of claim 3 wherein the BWAN parameters indicated to be affected during CLC class operations include one or more of a maximum latency and a maximum data rate for BWAN communications between the BWAN transceiver and the BWAN base station.

5. The multi-radio platform of claim 2 wherein the MRP coexistence controller is further configured to:

receive a request from the co-located transceiver to activate one of a plurality of CLC classes;

generate and send the CLC request message to the BWAN base station in response to the request received from the co-located transceiver; and receive a CLC response from the BWAN base station indicating whether the requested CLC class has been accepted, wherein the co-located transceiver is configured to generate the request to activate one of the plurality of CLC classes when the co-located transceiver is to communicate with the local wireless device.

6. The multi-radio platform of claim 5 wherein the CLC classes include:

one or more static CLC classes in which a time pattern for scheduling the active interval is not configurable by the BWAN base station; and a dynamic CLC class in which the time pattern for scheduling the active interval is configurable by the BWAN base station.

7. The multi-radio platform of claim 6 wherein the static CLC classes are requested for at least one of synchronous short-range digital communications, Wireless Local Area Network (WLAN) data transmissions, and Wireless Fidelity (WiFi) beacon interval broadcasts.

8. The multi-radio platform of claim 5 wherein, based on a CLC class accepted by the BWAN base station, the MRP coexistence controller is configured to:

indicate the accepted CLC class to the co-located transceiver, the indication to include parameters of the accepted CLC class including a transmission or reception time and a length of the active interval; and provide a temporal RF release (TRR) message to instruct the co-located transceiver when to conduct transmissions and receptions with the local wireless device, wherein the TRR message is provided at each active interval.

9. The multi-radio platform of claim 8 wherein the MRP coexistence controller is further configured to:

receive a request from the co-located transceiver to terminate one or more active CLC classes after the co-located transceiver completes an associated activity; and send a CLC request message to the BWAN base station to terminate the one or more active CLC classes.

10. The multi-radio platform of claim 8 wherein the MRP coexistence controller is further configured to:

receive a CLC response message from the BWAN base station to reconfigure the accepted CLC class, wherein the accepted CLC class is reconfigured to at least meet a request accepted in a previous response; and notify the co-located transceiver of a changed time pattern indicated in the CLC response message.

11. The multi-radio platform of claim 1 wherein the BWAN transceiver and the BWAN base station are configured to communicate in accordance with at least some Electrical and Electronics Engineers (IEEE) 802.16 communication standards.

12. The multi-radio platform of claim 1 wherein the BWAN transceiver and the BWAN base station are configured to communicate in accordance with at least some 3rd Generation Partnership Project (3GPP) Universal Terrestrial Radio Access Network (UTRAN) Long Term Evolution (LTE) communication standards communication standards.

13. A method performed by a coexistence controller of a multi-radio platform (MRP), the method comprising:

generating a co-located coexistence (CLC) request message in response to a request from a co-located transceiver, the CLC request message for transmission to a broadband wireless access network (BWAN) base station to reserve time for communications by the co-located transceiver; and including parameters in the CLC request message for a requested CLC class, wherein during an active interval, the BWAN base station is configured to refrain from scheduling communications with a BWAN transceiver based at least in part on the parameters of the CLC request message to allow interference-free communications with a local wireless device.

14. The method of claim 13 further comprising:

requesting whether the BWAN base station supports CLC class operation by setting one or more CLC class support bits in a registration request message at network entry; and receiving within a registration response message from the BWAN base station an indication that the BWAN base station supports the CLC class operation, the indication to include one or more parameter limits of supported CLC classes, the parameter limits including at least a maximum active interval and a maximum active ratio.

15. The method of claim 14 further comprising receiving within the registration response message an indication of BWAN parameters affected during CLC class operations.

16. The method of claim 14 further comprising:

receiving a request from the co-located transceiver to activate one of a plurality of CLC classes;

generating and sending the CLC request message to the BWAN base station in response to the request received from the co-located transceiver; and receiving a CLC response from the BWAN base station indicating whether the requested CLC class has been accepted,
wherein the co-located transceiver is configured to generate the request to activate one of the plurality of CLC classes when the co-located transceiver is to communicate with the local wireless device.

17. The method of claim 16 wherein the CLC classes include:
one or more static CLC classes in which a time pattern for scheduling the active interval is not configurable by the BWAN base station; and
a dynamic CLC class in which the time pattern for scheduling the active interval is configurable by the BWAN base station.

18. The method of claim 16 wherein, based on a CLC class accepted by the BWAN base station, the method further comprises:
indicating the accepted CLC class to the co-located transceiver, the indication to include parameters of the accepted CLC class including a transmission or reception time and a length of the active interval; and
providing a temporal RF release (TRR) message to instruct the co-located transceiver when to conduct transmissions and receptions with the local wireless device,
wherein the TRR message is provided by the coexistence controller at each active interval.

19. A broadband wireless access network (BWAN) comprising at least one BWAN base station configured to respond to a co-located coexistence (CLC) request message from a BWAN transceiver of a mobile communication station, the CLC request message to reserve time for communications by a co-located transceiver of the mobile communication station,
wherein during an active interval, the BWAN base station is configured to refrain from scheduling communications with the BWAN transceiver based at least in part on the parameters of the CLC request message to allow interference-free communications between the co-located transceiver and a local wireless device.

20. The BWAN of claim 19 wherein the BWAN base station includes a multi-radio coexistence controller configured to reserve time during the access interval in response to the CLC request message,
wherein the multi-radio coexistence controller of the BWAN base station is configured to:
receive, as part of a registration process for network entry a registration request message that requests whether the BWAN base station supports CLC class operation by setting one or more CLC class support bits in the registration request message at network entry; and
provide within a registration response message to the mobile communication station an indication that the BWAN base station supports CLC class operation, the indication to include one or more parameter limits of supported CLC classes, the parameter limits including at least a maximum active interval and a maximum active ratio.

21. The BWAN of claim 20 wherein, as part of the registration process, the multi-radio coexistence controller of the BWAN base station is further configured to provide within the registration response message an indication of BWAN parameters affected during CLC class operations.

22. The BWAN of claim 20 wherein the co-located transceiver is configured to generate the request to activate one of the CLC classes when the co-located transceiver is to communicate with the local wireless device,
wherein in response to the request to activate one of the CLC classes, a multi-radio platform (MRP) co-existence controller of the mobile communication station is configured to generate and send the CLC request message to the BWAN base station in response to the request received from the co-located transceiver, and
wherein the multi-radio coexistence controller of the BWAN base station is further configured to send a CLC response to indicate whether the requested CLC class has been accepted.

23. The BWAN of claim 19 wherein the BWAN base station communicates with the mobile communication station within orthogonal frequency division multiple access (OFDMA) downlink and OFDMA uplink subframes,
wherein the active interval is to occur during a plurality of the downlink and uplink subframes, and
wherein the downlink and uplink subframes and time-division multiplexed comprise a same set of a plurality of frequency subcarriers.

24. The BWAN of claim 19 wherein the BWAN base station transmits to the mobile communication station within orthogonal frequency division multiple access (OFDMA) downlinks and the mobile station transmits to the BWAN base station using a single-carrier multiple access uplink, and
wherein the downlinks and the single-carrier multiple access uplink comprise non-interfering frequency subcarriers.

25. A method of reserving time for communications by a co-located transceiver of a mobile communication station, the method comprising:
responding to a request message from a network transceiver of the mobile communication station to reserve time for communications by the co-located transceiver; and
refraining from scheduling communications with the transceiver during an active interval based at least in part on the parameters of the request message to allow interference-free communications between the co-located transceiver and a local wireless device.

26. The method of claim 25, wherein the method is performed by a base station, the method further comprising:
receiving, as part of a registration process for network entry, a registration request message that requests whether the base station supports coexistence class operation by having one or more class support bits set in the registration request message at network entry; and
providing within a registration response message to the mobile communication station, an indication that the base station supports coexistence class operation, the indication including one or more parameter limits of supported coexistence classes, the parameter limits including at least a maximum active interval and a maximum active ratio.

27. The method of claim 26 further comprising within the registration response message an indication of parameters affected during coexistence class operations,
wherein the parameters include one or more of a maximum latency and a maximum data rate for communications between the transceiver and the base station.

* * * * *